United States Patent [19]
Chen

[11] Patent Number: 5,282,414
[45] Date of Patent: Feb. 1, 1994

[54] MATERIAL RESERVING, DISPENSING AND PLANING DEVICES FOR A STONE FRUIT BISCUIT MACHINE

[76] Inventor: Tsai-An Chen, No. 201, Sec. 3, Bar-Dar Road, Taipei, Taiwan

[21] Appl. No.: 43,778

[22] Filed: Apr. 6, 1993

[51] Int. Cl.$^5$ .............................................. A47J 37/00
[52] U.S. Cl. ........................................ 99/353; 99/355; 99/341; 99/423; 99/443 C; 99/450.1
[58] Field of Search .............. 99/341, 423, 443 C, 99/450.1, 353, 355, 345, 349, 324, 352

[56] References Cited
U.S. PATENT DOCUMENTS

| | | |
|---|---|---|
| 4,535,687 | 8/1985 | Antpöhler .......................... 99/355 |
| 4,711,166 | 12/1987 | Chen .................................. 99/450.1 |

*Primary Examiner*—Harvey C. Hornsby
*Assistant Examiner*—Reginald L. Alexander
*Attorney, Agent, or Firm*—Morton J. Rosenberg; David I. Klein

[57] ABSTRACT

Material reserving, dispensing and planing devices for a stone fruit biscuit machine comprising a meterial reserving device, a material dispensing device, a material planing device and a sucking device, to automatically prepare planed stone fruit pieces to drop on dough orderly placed on baking plate by receiving material stone fruit, reserving and dispensing predetermined quantity for planing, sucking planed flat pieces on to a sucking plate, and then dropping them down on the dough placed orderly on a baking plate.

4 Claims, 10 Drawing Sheets

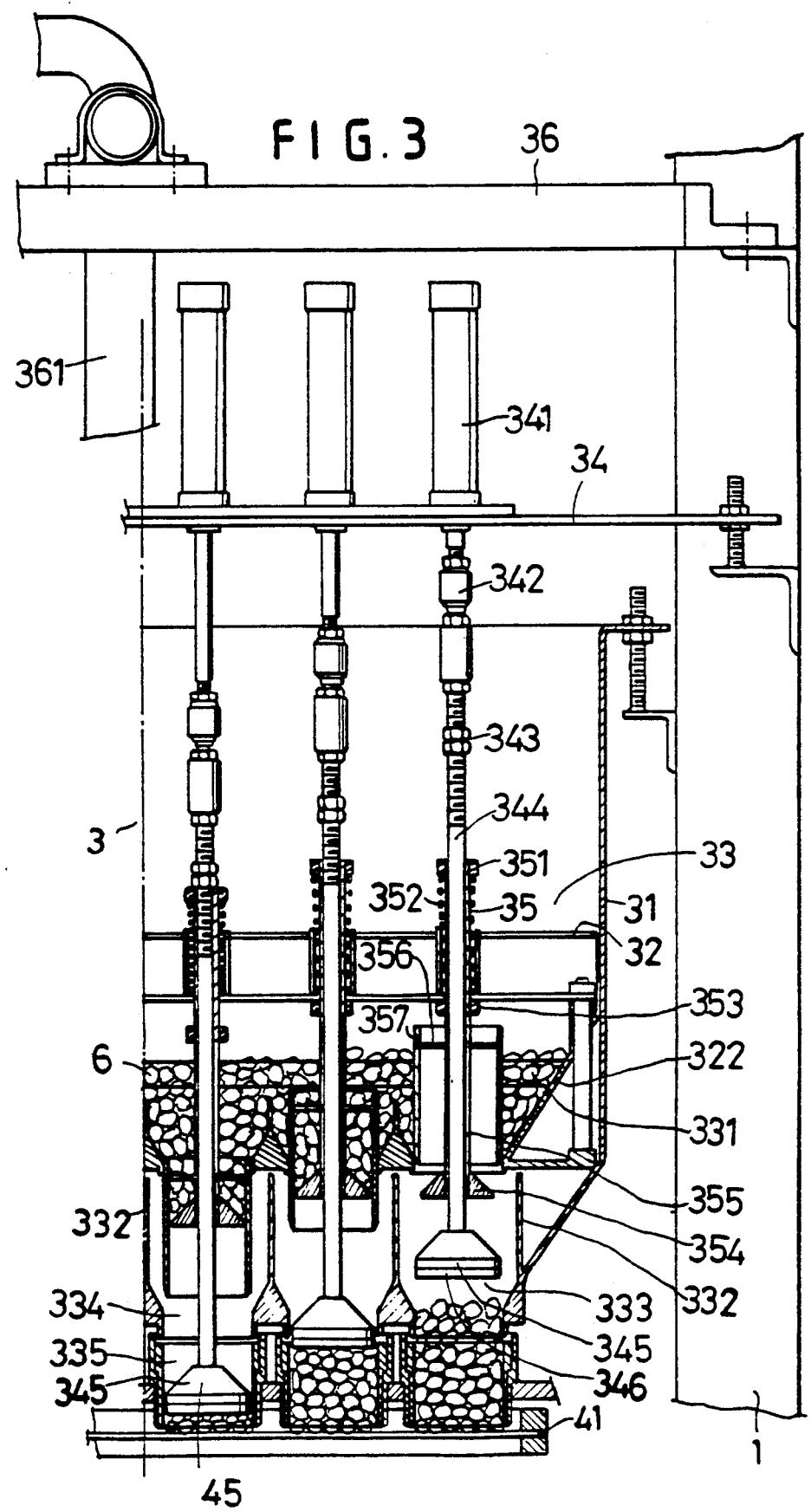

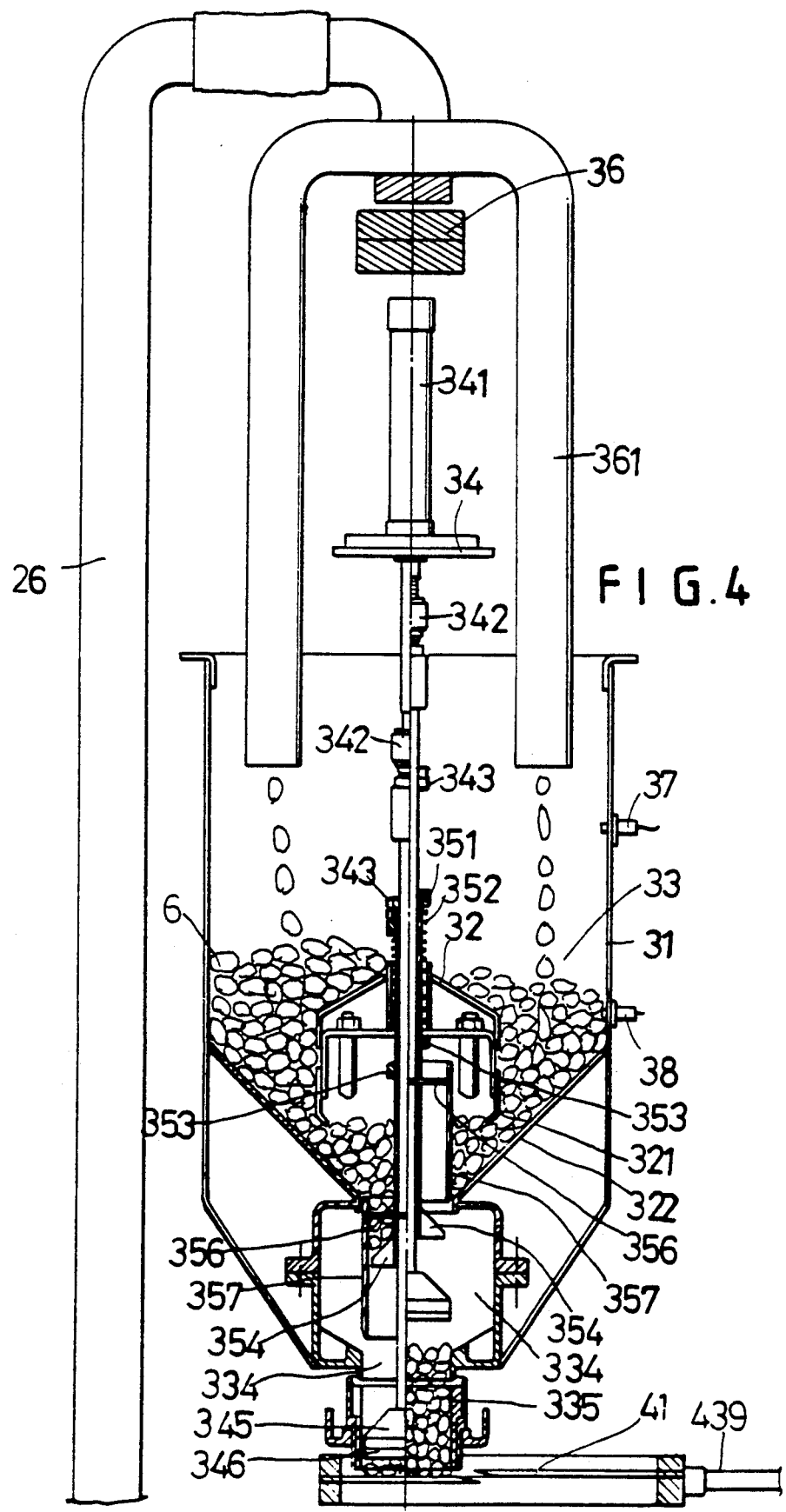

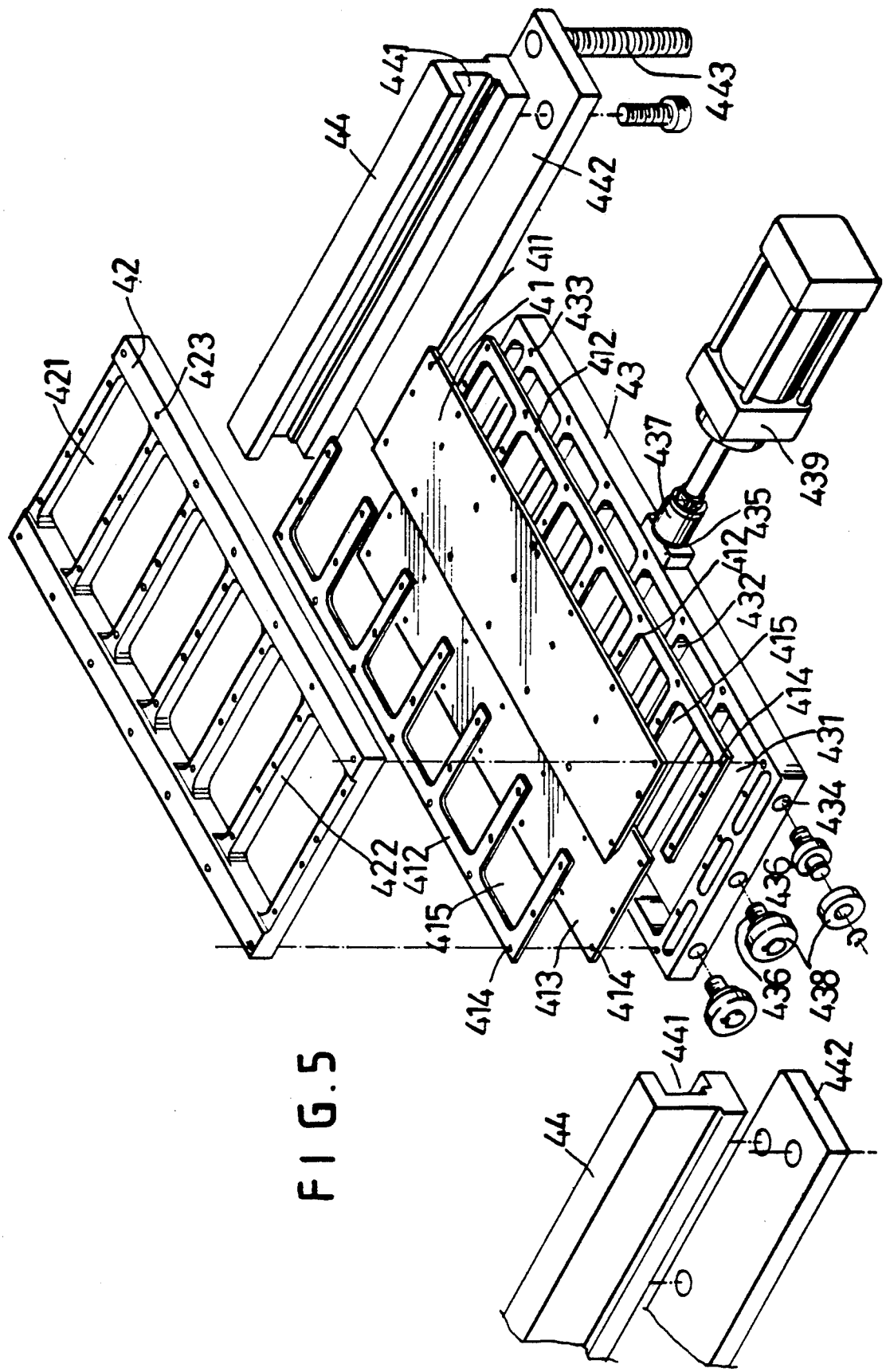

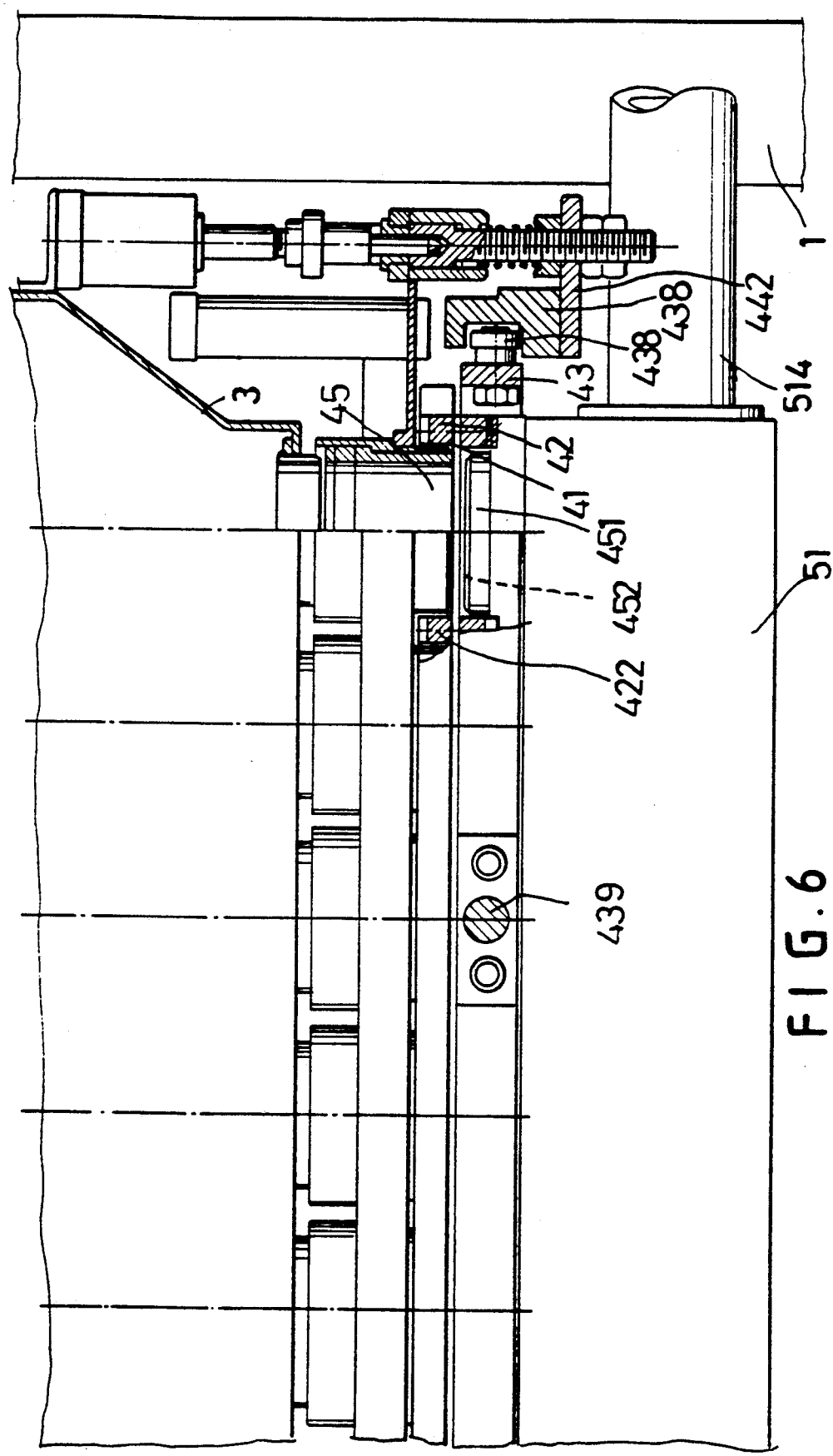

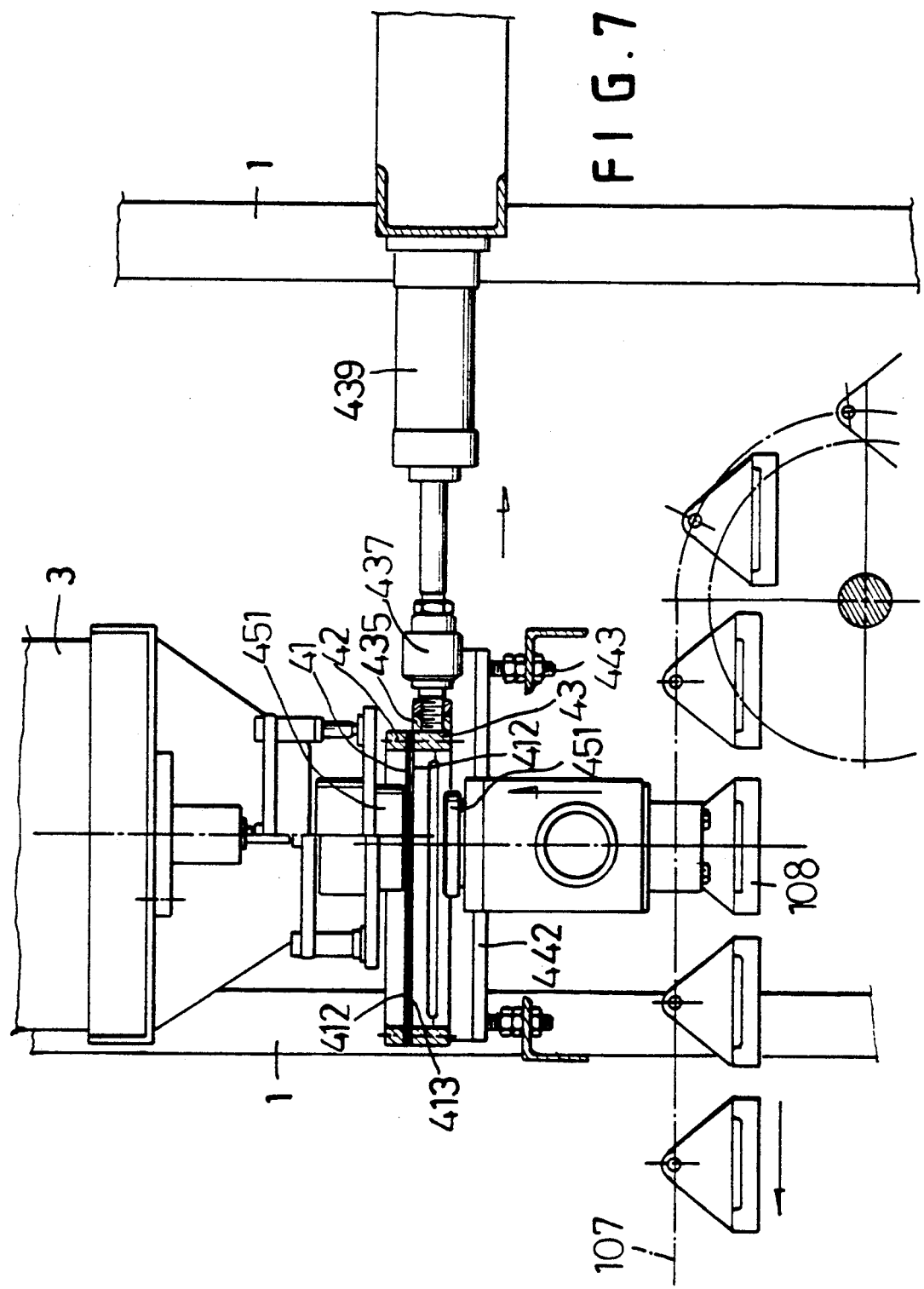

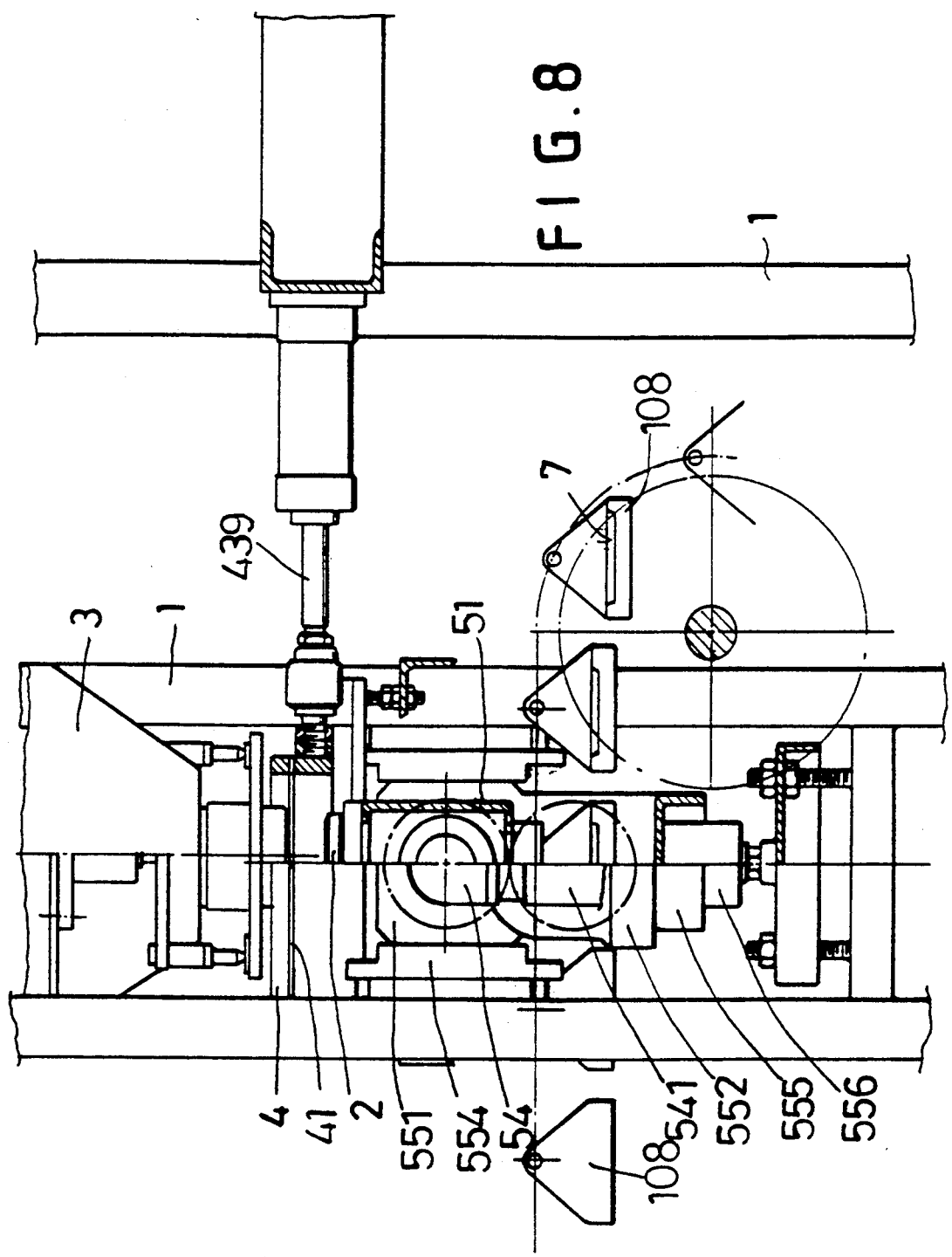

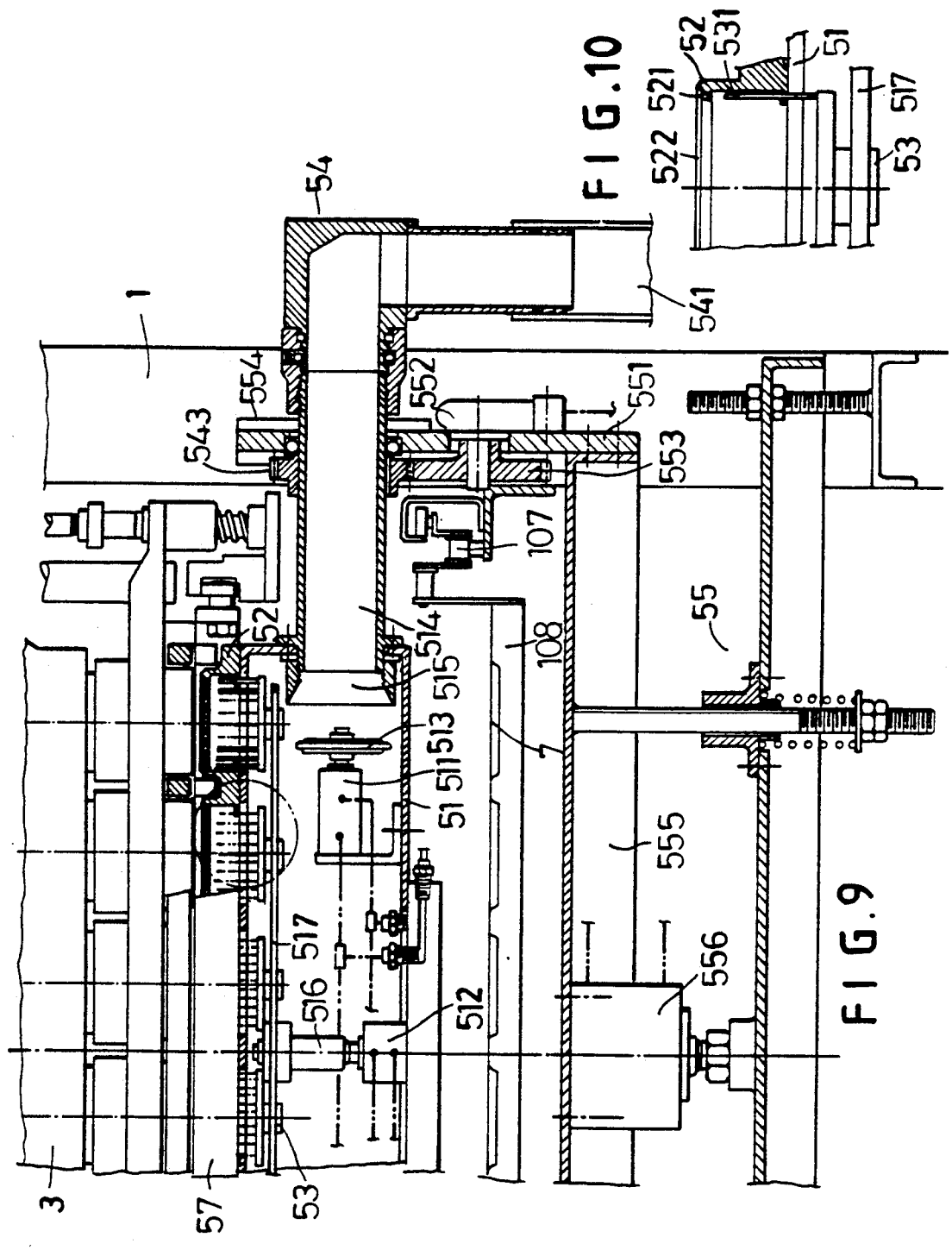

MATERIAL RESERVING, DISPENSING AND PLANING DEVICES FOR A STONE FRUIT BISCUIT MACHINE

BACKGROUND OF THE INVENTION

A known stone fruit biscuit machine of Japanese Patent No. 61195991 and U.S. Pat. No. 4,711,166 has flowing operations of material reserving, material restoring, planing, sucking, baking and cooling. However, this machine has been found to have many drawbacks as follows.

1. A reserve chamber has an excessive height, more than two meters, quite inconvenient to pour a heavy bag of material stone fruit into the chamber.
2. The reserve chamber is shaped long and rectangular and the upper surface has to be flattened in order to equally force the stone fruit therein to be sent out of a plurality of tubes.
3. The reserve chamber is located very high and an examination window for checking the content material is liable to reflect light, difficult to check the volume of material therein.
4. The reserve chamber has not a complete structure to dispensing material in definite pressure and definite volume.
5. A blade in a planing device has a large dimensions and thin, and an intermediate portion of a blade frame produces disfigurement caused by large pressure coming from many material conveying tubes, and consequently planed stone fruit pieces are not all equally thin.
6. A sucking plate cannot suck all of planed stone fruit pieces to cause finished products incomplete with cavities and notches.
7. The planing device is too complicated and large, hardly cooperative in different processes, so that planed stone fruit pieces may drop down in the process of sucking to scatter around on the ground or in the bottom of the machine.
8. Cleaning scattered stone fruit pieces increases producing cost, not economical.
9. Planed stone fruit pieces are sucked mainly in the middle portion, and those in both sides are not sucked with sufficient force, liable to drop down.
10. A sucking plate and cone-shaped sucking holes do not function as planned to permit planed stone fruit pieces drop down when a fan is stopped, but in practical operation oil coming out of stone fruit can block up the sucking holes and they stick there.
11. A fan blowing the sucking holes will have growing load and produce noise by repeated blockage of the sucking holes.

SUMMARY OF THE INVENTION

This invention has been devised to improve the material reserving, restoring, dispensing and planing and sucking devices in the above-mentioned automatic stone fruit machine, with better features as follows.

1. It makes use of a blower to assist to convey stone fruit in a reserve tank mounted under a machine table through a conduit in a volume pre-determining chamber. Then a worker only checks the content of the reserve tank, without necessity of checking the volume pre-determining chamber, or of climbing up a conventional machine for checking a high positioned reserve chamber.
2. It includes an inverted U-shaped exit tube moved by a non-rod air cylinder to move back and forth above the volume predetermining chamber and drop stone fruit in the chamber in average condition so as to dispense equally stone fruit in a plurality of exit tubes.
3. Stone fruit in each exit tube above a blade are pressed down with a preset definite pressure so that the stone fruit in each exit tube are closely packed to be planed into equally thin flat pieces. In addition, the pressure can be adjusted according to sizes, hardness, shapes of stone fruit.
4. When planed stone fruit are planed, the planed thin pieces are quickly sucked down by a sucking plate below the blade, possible to be orderly placed on the sucking plate.
5. Planing and sucking process are well coordinated to suck planed stone fruit pieces to drop on the sucking plate in order, without falling down on the ground or the bottom of the machine, and consequently quality of finished products can be secured perfect.
6. An upper and a lower blade frame have ribs and pinch the blade, two packings and separating plate between them, having enough strength to endure pressure coming from a plurality of material conveying tubes so that an intermediate portion of the blade with the frame cannot sag down to a result that all of planed stone fruit pieces are equally thin.
8. Its whole size is smaller than the conventional one.
9. It includes a hole cleaner with needles to clean sucking holes in the sucking plate every time when Planed stone fruit pieces are dropped from the sucking plate to a baking plate so that no stone fruit pieces are kept stuck in the sucking plate.
10. Each time when the needles finish operation, stone fruit bits in the sucking holes can be cleaned off, never blocked, so a blower does not have heavy load, nor produce noise.
11. Operation of sucking and placing planed stone fruit pieces is quite accurate, and so planed stone fruit pieces do not fall down on the ground or in the bottom of the machine.
12. The whole structure of the machine has been made and tested, having better function than the conventional one.

BRIEF DESCRIPTION OF DRAWINGS

The invention will be better understood by reference to the accompanying drawings, wherein:

FIG. 3 is a front cross-sectional view of a material volume pre-determining chamber in the present invention;

FIG. 4 is a side cross-sectional view of the material volume pre-determining chamber in the present invention;

FIG. 5 is an exploded perspective view of a material planing device in the present invention;

FIG. 6 is a front cross-sectional view of the material planing device and turning cylinder in the present invention;

FIG. 7 is side view of the material planing device and the turning cylinder in the present invention;

FIG. 8 is a partial cross-sectional and side view of the material planing and the turning cylinder in the present invention;

FIG. 9 is a front view of the interior structure of the turning cylinder in the present invention;

FIG. 10 a cross-sectional view of the turing cylinder and a sucking plate in the present invention;

DESCRIPTION OF THE PREFERRED EMBODIMENTS

Figure 1:
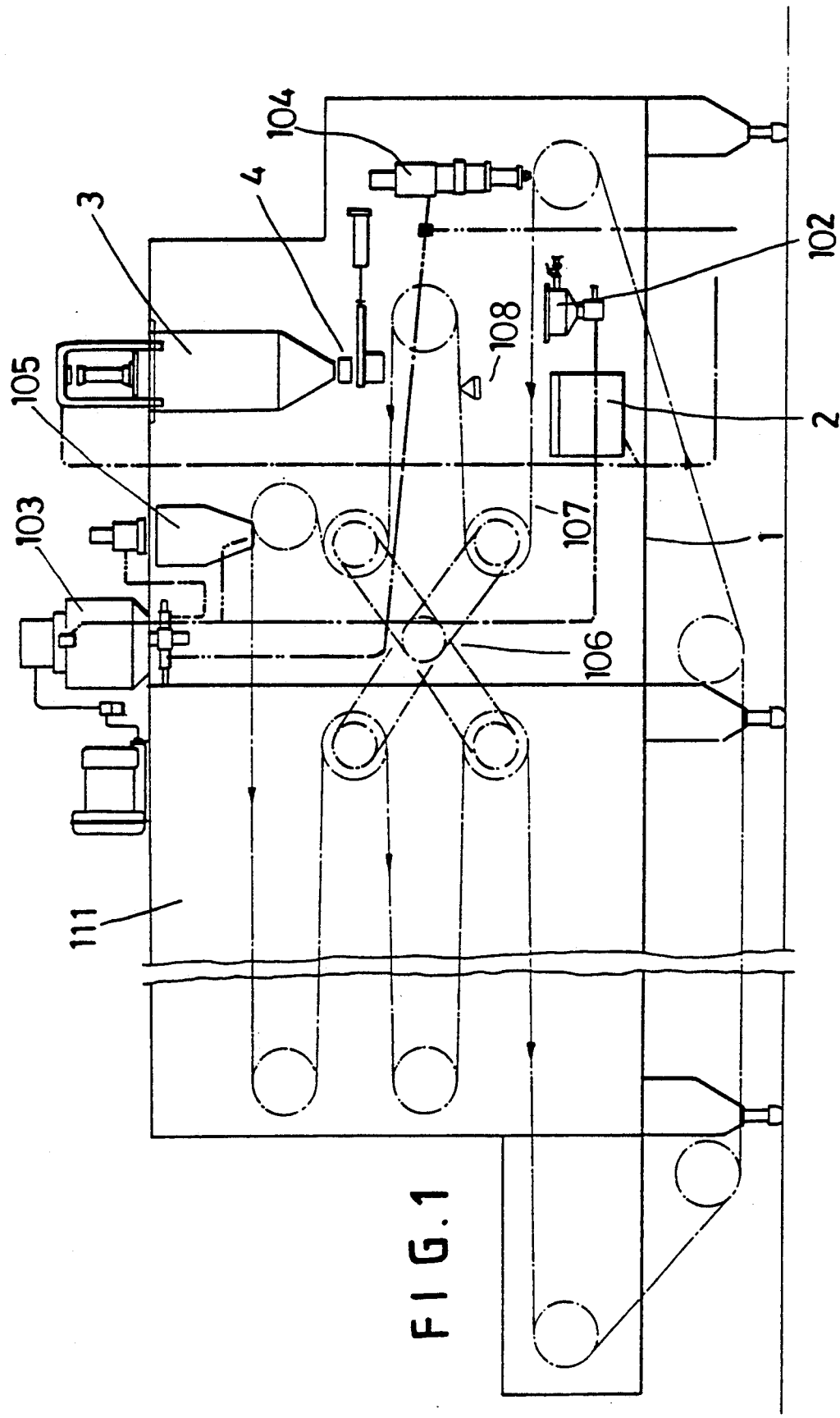
FIG. 1 is a diagram of manufacturing processes of a stone fruit biscuit machine in the present invention.

FIG. 1 shows a diagram of manufacturing process of a stone fruit biscuit machine, wherein includes a machine body 1, a dough receiving funnel 102, a dough reserving tank 103 connected with the funnel 102 with a conduit tube, a first sprayer 104 receiving dough from the reserving tank 103 and dispensing out bottom dough, a convey unit 106, a chain 107 moved by the convey unit 106 to move forward intermittently baking plates 108 with bottom dough on their surfaces to a planing device 4 which planes stone fruit coming out of a material volume pre-determining chamber and drops planed stone fruit pieces on a sucking plate 52, which is invertedly moved with planed stone fruit pieces to a baking plate 108, then the planed stone fruit being dropped on the baking plate 108 which is then conveyed to a second sprayer 105 to spray facial dough on the bottom dough with stone fruit pieces on the baking plate 108 and to be sent into a baking stove 111 for baking. The material volume pre-determining chamber 3 receives material stone fruit from a material reserve tank 2.

Figure 2:
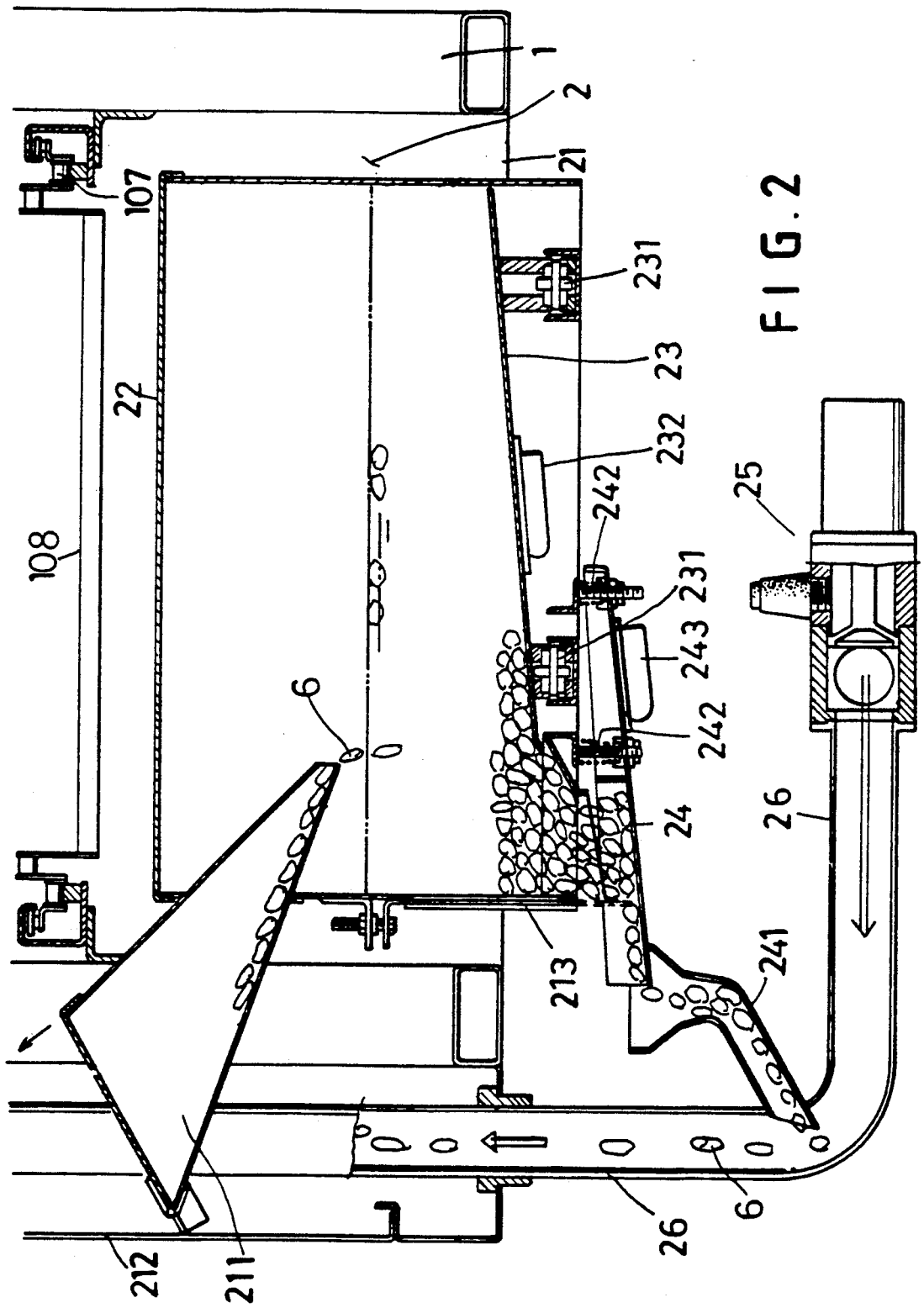
FIG. 2 is a side cross-sectional view of a material reserve tank in the present invention.
Figure 14:
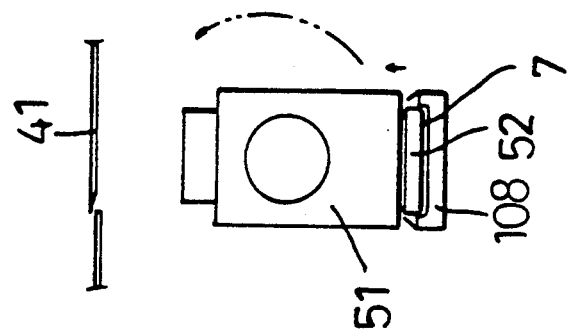
Figure 13:
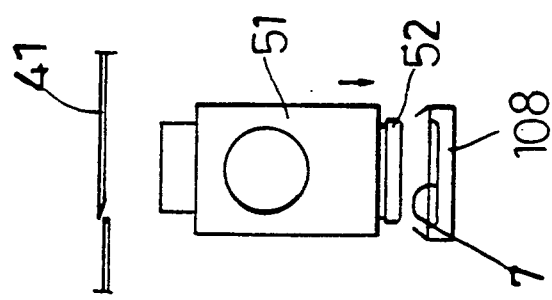
FIG. 13 is a front view of the planing device and the turning cylinder with the sucking plate in the present invention showing the turning cylinder with the sucking plate in an inverted position to be lowered down to near the sucking plate to the baking plate; and, FIG. 14 is a front view of the planing device and the turning cylinder with the sucking plate in the present invention, showing the turning cylinder with the sucking plate in the inverted position and lowered down with the sucking plate near the baking plate for releasing planed stone fruit pieces onto the baking plate.
Figure 12:
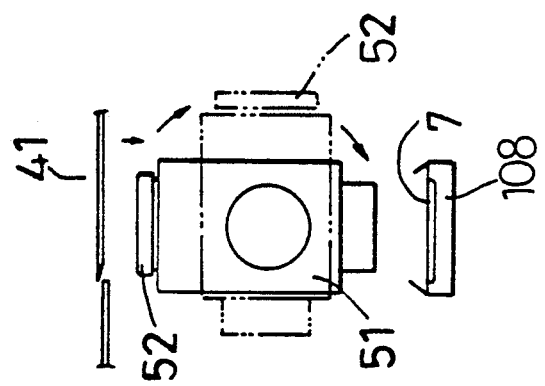
FIG. 12 is a front view of the planing device and the turning cylinder with the sucking plate in the present invention, showing the turning cylinder with the sucking plate being in a lowered position and beginning to be rotated for 90 to a position shown in a dotted line.
Figure 11:
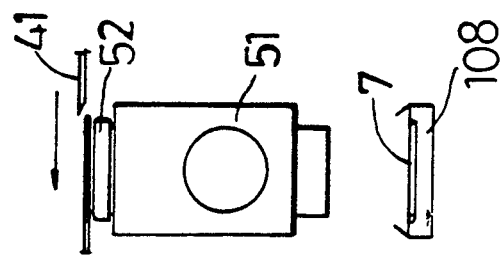
FIG. 11 is a front view of the planing device and the turning cylinder in the present invention, showing the turning cylinder with the sucking plate being in an upper definite position.

The material reserve tank 2 shown in FIG. 2, has a tank body 21, an upper cap 22, a vibrating bottom plate 23, a material dealing-out case 24, a changeover valve 25, and a conduit 26. The tank body 21 is mounted on the machine body 1 having a inlet hopper 221 to receive material fruit from a door 121 in a side wall of the machine body 1. A control shutter 213 is provided in the bottom of the tank body 21 to control the volume of the material stone fruit passing out of the dealing-out case 124, and the material drops in a hopper 241 and then into a conduit 26 connected with a blower (not drawn in the Figures) and then is sent into the material volume pre-determining chamber 3 controlled by the changeover valve 25, which will be described later. The vibrating bottom plate 23 is fixed on the inner bottom of the tank body 21 and supported on a shock-absorbing base 231. The material dealing-out case 24 is sustained by shock-absorbing springs 241, and air pressure vibrators 232, 243 are respectively provided under the vibrating bottom plate 23 and the case 24, assisting to send smoothly material into the conduit 26.

The material volume pre-determining chamber 3 shown in FIGS. 3 and 4 has its body 31 mounted on the machine body 1, a coneshaped cap 32, an adjusting plate 321 and a hopper 322 forming an upper chamber 33 and a lower chamber 331, a plurality of vertical partition broards 332, a plurality of defining volume chambers 333 separated by the boards 332. Each chamber 333 has a exit 334 in its bottom communicating with an exit tube 35. A locating plate 34 is provided on a proper place of the chamer body 31 for mounting a plurality of an pressure cylinders 34 respectively connected cone-shaped press head 345 fixed at a lower end of the shaft 344 and a soft rubber cushion 346 on the press head 345. A spring tube 35 is provided around the shaft 344 between the location adjusting nuts 343 and the cone-shaped press head 345, having an upper flange 351, a coil spring 352 around the tube 35, a locating lower flange 353, and a cone-shaped member 354. A pin 356 is provided to pass laterally through the shaft 344 between the locating lower flange 353 and the cone-shaped member 354, having its both ends fixed on opposite sides of the slide cylinder 357 and a non-rod air cylinder 36 is provided horizontally above the air cylinders 341, connected with an inverted U-shaped exit tube 361, which is then moved horizontally back and forth above the material volume pre-determining chamber 3 so that material stone fruit coming from the conduit 26 may be dropped down equally around in the chamber 3 through the inverted U-shaped exit tube 361.

An upper and a lower electronic eyes 37, 38 are provided in proper places of walls of the body 31 for sensing material reserved in the upper chamber 33, sending a signal to the changeover valve 25 to permit an exit of the blower communicating with the conduit 26 and to start the air pressure vibrators 232 to work, moving the material in the tank body 21 through the material dealing-out case 24, the hopper 241 into the conduit 26 by means of wind force and then into the inverted U-shaped exit tube 361 connected with the conduit 26 and finally dropping into the upper chamber 33 of the chamber body 31. Then the material coming through the inverted U-shaped exit tube 361 moved back and forth by the non-rod air cylinder 36, dropping equally around on both sides of the cone-shaped cap 32 and into the lower chamber 331 via an adjusting plate 321. When material is accumulated to a height high enough for the upper electronic eye 37 to sense out, the eye 37 functions to send out a signal to stop moving-in of material therein.

Each exit tube 335 of the material volume predetermining chamber 3 is placed to be located just above a blade frame of the planing device 4, and a blade 41 is just placed under the exit of the tube 335. When the adjusting plate 321 stops material 6 from moving in the lower chamber 331 and the air cylinder 341 is stopped, the slide cylinder 357 stops the exit of the lower chamber 331. When the shaft 344 is pressed to move downward by operation of the air cylinder 341, the location adjuster 343 is also moved down to contact the upper flange 352 and continues to press it down to a certain position where the top of the slide cylinder 357 reaches the exit of the lower chamber 331 so that the material 6 may drop into the slide cylinder 357 until the material 6 fills the slide cylinder 357, the bottom of which is stopped by the cone-shaped member 354. If the air cylinder 341 pulls up the shaft 344, the slide cylinder 357 goes up filled with material 6, the cone-shaped mamber 354 stops at the position, and the slide cylinder 357 continues to go up, with its upper surface passing above the height of the material in the lower chamber 331 and with its bottom passing above the cone-shaped member 354. Then the material 6 in the slide cylinder 357 being of a definite volume drops through its own open bottom in the exit tube 335. Then the soft cushion 346 with the press head 345 is gradually lowered down to a lowest position by the shaft 344 pressed by the air cylinder 341, forcing the material stone fruit gradually planed by the blade 41 in the planing device 4 until only a layer of stone fruit is left in the exit tube 335. The pressure of the press head 345 can be adjusted by an air pressure adjusting valve of the cylinder 341. Then the shaft 344 is to be pulled up again by the air cylinder 341. Then the same operation of carrying the material down to the planing device 4 is repeated again and again, always leaving a layer of material stone fruit in the exit tube 335.

The planing device 4 shown in FIG. 5 has a blade 41, an upper blade frame 42, a lower blade frame 43 and two rails 44, 44.

The blade 41 has a plurality of fixing holes 411, and two packings 412, 412 and a separating board 13 are placed on and under the blade 41, having also a plurality of fixing holes 414 as those 411. The packings 412, 412 have a plurality of rectangular large openings 415.

The upper blade frame 42 and the lower blade frame 43 have the same shape and size for pinching the blade 41, the two packings 412, 412 and the separating board 413 between them to secure the blade 41, and having a plurality of rectangular holes 421, 431 and reinforcing ribs 422 432. The upper blade frame 42 has a plurality of holes 423 corresponding to a plurality of threaded holes 433 that the lower blade frame 43 has so as to assemble both frames 42, 43 together with screws. The lower blade frame 43 has three threaded holes 434 in the right and the left side for fixing rolling shafts 436 pivotally connected with bearings 438, and a securing member 435 on the middle of a rear side for connecting a gimbals 437 and then with a air cylinder 439 mounted on the machine body 1.

The rails 44, 44 have a lengthwise groove 441 for the bearings 438 to slide along therein, fixed firmly on adjusting plates 442, 442 mounted securely on proper places on the machine body 1.

In assembling, referring to FIGS. 5-7, the planing device 4 is retracted to a retreated position by operation of the air cylinder 439. At this position, the material pre-determining chamber 3 has its exit above the separating board 413, and the gap between them is higher than the thickness of the packing 412 for material stone fruit to expose from the exit tube 325 When the air cylinder 433 moves forward the planing device 4, the blade 41 begins to plan the stone fruit. As movement of the air cylinder is fast, the blade 41 quickly planes proper thin pieces off the stone fruit, which slide through the gap between the blade 41 and the separating board 413, and then sucked on by a sucking plate 52 below the board 413. Then planed stone fruit pieces are held to lie in order on the sucking plate 52.

A sucking plate unit shown in FIGS. 8-14, is provided between the planing device 4 and the baking plates 108, having an elongate turning cylinder 51, a sucking plate 52, a hole cleaner, a rotatable joint 54 and a lift base 55.

The elongate turning cylinder 51 with a rectangular cross-section has an air cylinder 511 in both ends and a vertical air cylinder 512 in its interior and each cylinder 511 has a piston 513 to block or open an open end of an orifice 515 of a side tube 514. Then vertical air cylinder 512 is connected with a connecting shaft 516, a horizontal rod 517 and then the hole cleaner 53, which has many needles 531 to correspond to many sucking holes 521. The size of the sucking holes 521 is a little larger than that of the needles 531, which are inserted in or pulled out of the sucking holes 521 by the vertical air cylinder 512. Then sucking plate 52 has a shallow recess on its upper surface. The rotatable joint 54 is of an L shape, having one end pivotally connected with the side tube 514 of the turning cylinder 51 and the other end connected with a blower via a soft tube. A gear 543 is mounted around an outer surface of the side tube 514 to engage a gear 553 of a rotating cylinder 552 mounted on a slide plate 551. The rotating cylinder 552 to rotate the turning cylinder 51 for 180, in other words, to invert it. The slide plate 551 is lifted up or lowered down by an air cylinder 556 via a horizontal frame 555 and a slide groove 554.

In operating, referring to FIGS. 8-14, the sucking plate 52 is lifted up a little below the blade 41, and when the blade 41 is gradually retracted back, planed stone fruit pieces drop just the shallow recess 522 of the plate 52. Meanwhile, the air cylinders 511, 512 all retreat back, and the blower produces sucking wind to suck the planed stone fruit pieces on the sucking plate 52. Then the air cylinder 552 operates to turn the turning cylinder 51 with the sucking plate 52 for 180 to an inverted position shown in FIG. 13 and the air cylinder 556 operates to move down the whole turning cylinder 51 with the sucking plate 52 to about 2 cm. high above the baking plate 108. And the air cylinder 511 moves its piston 513 forward to block the orifice 514 and consequently the sucking force in the turning cylinder 51 disappears, permitting the planed stone fruit pieces on the sucking plate 52 drop down in biscuit molds on the baking plate 108. At the same time, the vertical air cylinder 512 operates to lift the needles 531 to insert in the sucking holes 521 to push small bits of stone fruit 6 sticking there and on the shallow recess to drop down on the biscuit molds 7. After that the needles 531 are retracted back, the rotatable air cylinder 552 rotates back and the air cylinder 556 works, rotating the whole turning cylinder 51 with the sucking plate 52 back for 180 to the original position to wait for the next operation.

While the preferred embodiments of the invention have been described above, it will be recognized and understood that various modifications may be made therein and the appended claims are intended to cover all such modifications which may fall within the spirit and scope of the invention.

What is claimed is:

1. Material reserving, dispensing, and planing devices for a stone fruit biscuit machine comprising:
   a material reserve tank mounted in a machine body, having a body, an upper cap, a control shutter and an inlet funnel, said body having a vibrating bottom plate and a material exit case respectively sustained by an air pressure vibrator to vibrate them to move stone fruit grains down said exit case and a hopper below said exit case into a conduit, which conveys material stone fruit to an upper end of a material volume predetermining chamber by means of a blower connected with said conduit and a changeover valve;

said material volume pre-determining chamber mounted on said machine body, having a cone-shaped cap, an adjusting plate, a funnel inside said chamber forming an upper chamber and a lower chamber to temporarily store said stone fruit coming from said conduit, a plurality of definite volume chambers under said lower chamber separated with partition boards, each said volume predetermining chamber having an open exit in its bottom to connect with an exit tube located on a blade of a planing device, a locating plate provided above said volume pre-determining chamber body for mounting a plurality of air cylinders respectively having a long shaft extending down to reach in said definite volume chamber, said long shaft being connected with position adjusting nuts on its upper portion, a spring tube, a slide cylinder and a cone-shaped member on its intermediate portion, and a press head with a soft cushion at its bottom end, said shaft being lowered down to a certain down position by said air cylinder, where said stone fruit droped on said lower chamber may move down to fill in said slide cylinder, said shaft being then pulled up with said slide cylinder also moving up together and bringing up a definite volume of stone fruit therein, said shaft being lifted up to a certain up position and stopped with the cone-shaped member already separating from said open bottom end of said slide cylinder permitting said stone fruit in said slide cylinder drop down in said exit tube, said shaft being lowered down to force said press head with the soft cushion to press down said stone fruit to be planed by the blade of a planing device, said shaft being pulled up when the last layer of the stone fruit in said exit tube still remains and repeating up-and-down movement to bring down said stone fruit into said exit tubes for planing again and again;

a blade having many fixing holes to be sandwiched between two packings and a separating plate and then assembled between an upper blade frame and a lower blade frame, said packings having a plurality of rectangular openings;

said upper blade frame and said lower blade frame for assembling said blade and said two packings and said separating plate, having the same size and shape to correspond to each other, a plurality of rectangular holes in accordance with said rectangular openings of said packings, and reinforcing ribs between each two said rectangular holes, said upper blade frame having many holes to correspond to threaded holes provided in said lower blade frame for screws to assemble said blade, said two packings and said separating plate between both said frames, said lower blade frame having several threaded holes in the left and the right side to fix rolling wheels pivotally connected with bearings and a fixing block on the middle of a rear side to fix a gimbals to connect with said air cylinder mounted on said machine body to move said planing device back and forth;

two rails respective having lengthwise grooves for said bearings of said blade frames to fit and slide along therein, being mounted on said adjusting plate fixed on said machine body, said adjusting plate serving to adjust said blade frames in a horizontal direction;

an elongate turning cylinder having said air cylinder in both ends and a vertical air cylinder in its interior, said two air cylinders having a piston facing an end of a side tube having a gear fitted around the tube, said vertical air cylinder connected with a connecting shaft and then with a rod;

a plurality of sucking plates fixed on an outer side of said turning cylinder, having a shallow recess and many sucking holes;

a hole cleaner mounted on said rod of said vertical air cylinder of said turning cylinder, having many needles to insert in and retreat out of said sucking holes of said sucking plate for cleaning small bits of stone fruit pieces off, a rotatable joint of an L shape having one end pivotally connected with said side tube of said turning cylinder and the other end connected with said blower via a soft tube; and, a lift base having a slide plate fixed with a rotating air cylinder connected with a gear engaging said gear fitted around said tube, said slide plate pivotally connected with said side tube with a bearing and being lifted up or lowered down by a horizontal bar moved by an air cylinder.

2. The material reserving, dispensing and planing devices for a stone fruit biscuit machine as claimed in claim 1, wherein between said material reserve tank and said volume pre-determining chamber is connected said conduit connected with an inverted U-shaped exit tube above said volume pre-determining chamber, said inverted U-shaped exit tube connected with a non-rod cylinder which moves back and forth said exit tube above said material volume pre-determining chamber for dropping stone fruit equally around in said volume predetermining chamber, said chamber body having an upper and a lower electronic eye for checking the height of said stone fruit in said chamber, said lower electronic eye function to send a signal to start said blower and said changeover valve connected with said blower when said eye does not find any stone fruit therein, said air pressure vibrator being then started to move stone fruit through said exit case and said hopper into said conduit and then being blown up into said inverted U-shaped exit tube and finally into said material volume pre-determining chamber.

3. The material reserving, dispensing and planing devices for a stone fruit biscuit machine as claimed in claim 1, wherein when said planing device composed of said blade, said upper and said lower blade frame and said rails stops at the retreated position, said material exit of said material volume pre-determining chamber is located just on said separating plate of said planing device with a proper gap, which is a little higher than the thickness of said packing of said planing device, just for a layer of stone fruit to expose so that said blade may quickly move forward to plan proper thin stone fruit pieces off pushed by said air cylinder, said planed stone fruit pieces sliding out of said gap between said blade and said separating plate and suckingly received orderly by said sucking plate with said shallow recess below he planing device.

4. The material reserving, dispensing and planing devices for a stone fruit biscuit machine as claimed in claim 1, wherein said turning cylinder, said sucking plate, said hole cleaner, said rotatable joint and said lift base are located between said planing device and said baking plate, said planed stone fruit pieces droping on said sucking plate when said blade is being retracted back, with said sucking plate facing up and lifted near the bottom of said blade with a proper gap, said air cylinders and said vertical air cylinder of said turning cylinder then being in a retracted position, said blower producing sucking wind to suck planed stone fruit pieces on said sucking plate, said rotating cylinder beginning to rotate to turn said turning cylinder back to the upper most position for 180, said air cylinder of said lift base then going down to lower down said turning cylinder to a certain position, said sucking plate then moving down to a position about 2 cm. above said backing plate, said two air cylinders of said turning cylinder then moving forward to block up the orifice of said side tube to compel the sucking force in said turning cylinder to disappear and consequently to make planed stone fruit pieces drop on said baking plate, said vertical air cylinder at the same time beginning to operate, lifting said needles to push in said sucking holes to clear off bits of stone fruit pieces sticking therein and on said shallow recess of said sucking plate, said needles then moving down to its original position, said rotating air cylinder and said air cylinder on a horizontal frame then beginning to operate to rotate said turning cylinder back and then to lift it to its original position to wait for the next round of operation.

* * * * *